United States Patent [19]
Hille et al.

[11] Patent Number: 6,043,301
[45] Date of Patent: Mar. 28, 2000

[54] AQUEOUS COATING COMPOSITIONS

[76] Inventors: Hans-Dieter Hille, In der Schlade 24, Bergisch Gladbach, Germany, DE-51467; Horst Muller, Anemonenweg 20, Cologne, Germany, DE-51069

[21] Appl. No.: 08/750,046

[22] PCT Filed: May 25, 1996

[86] PCT No.: PCT/EP95/01982

§ 371 Date: Apr. 14, 1997

§ 102(e) Date: Apr. 14, 1997

[87] PCT Pub. No.: WO95/33011

PCT Pub. Date: Dec. 7, 1995

[30] Foreign Application Priority Data

Jun. 1, 1994 [DE] Germany .............................. 44 19 216

[51] Int. Cl.[7] ............................................... C08K 5/05
[52] U.S. Cl. ........................ 523/501; 523/502; 524/383
[58] Field of Search .................................. 523/501, 502; 524/507, 512, 513

[56] References Cited

U.S. PATENT DOCUMENTS

| | | | |
|---|---|---|---|
| 4,132,688 | 1/1979 | Berenschot | 523/502 |
| 4,661,223 | 4/1987 | Zedler | 524/513 |
| 4,978,708 | 12/1990 | Fowler | 524/507 |
| 5,331,039 | 7/1994 | Blum | 524/507 |
| 5,648,410 | 7/1997 | Hille | 523/501 |

FOREIGN PATENT DOCUMENTS

| | | |
|---|---|---|
| 0061628 | 10/1982 | European Pat. Off. . |
| 0158161 | 10/1985 | European Pat. Off. . |
| 0206059 | 12/1986 | European Pat. Off. . |
| 0391271 | 10/1990 | European Pat. Off. . |
| 0469389 | 2/1992 | European Pat. Off. . |
| 2708611 | 5/1978 | Germany . |
| 2712931 | 9/1978 | Germany . |
| 2732662 | 2/1979 | Germany . |
| 2732775 | 2/1979 | Germany . |
| 2744782 | 4/1979 | Germany . |
| 3128062 | 2/1983 | Germany . |
| 4027594 | 3/1992 | Germany . |
| 4209035 | 9/1993 | Germany . |

OTHER PUBLICATIONS

*Chemical Abstracts*, vol. 74, No. 14 (Apr. 5, 1971) Abstract No. 65755x.

*Primary Examiner*—Paul R. Michl
*Attorney, Agent, or Firm*—Dann, Dorfman,. Herrell & Skillman, P.C.

[57] ABSTRACT

The invention relates to aqueous coating compositions comprising:

an aqueous, polyester- and acrylate-based polymer dispersion obtainable by free-radical polymerization of at least:
 a. one (meth)acrylic acid ester;
 b. one ethylenically unsaturated, at least monofunctional acid; and optionally
 c. one ethylenically unsaturated monomer other than (a) and (b)

or mixtures thereof, with a poly ester resin capable of undergoing a free-radical polymerization;

one amino resin as crosslinking agent, one water-soluble and/or water-emulsifiable polyalcohol and optionally conventional laquer additives.

Furthermore, the invention relates to the use of these aqueous coating compositions as clear coats for the preparation of multi-layer coatings.

17 Claims, No Drawings

AQUEOUS COATING COMPOSITIONS

BACKGROUND OF THE INVENTION

1. Field of the Invention

The invention relates to aqueous, solvent-free, polyester- and polyacrylate-based coating compositions and the use thereof.

2. Statement of Related Art

A reduction of the contents of organic solvents in coating compositions is generally desired. There is great interest in aqueous surface coating systems in the field of coating and painting, especially so in the area of automotive painting, but also in other areas.

In the production-line painting of automotive bodies, multi-layer coatings according to the so-called "base coating/top coating" process are preferred. Therein, first a pigmented base coating is applied which, after some short drying time without a baking step, is covered with a clear-coat composition. Then the base coating and clear-coat composition in combination are subjected to baking. This procedure results in coatings having an optically and technologically very high quality.

As far as primers and base coatings are concerned, aqueous systems for a long time have belonged to the state of the art, and in part the use thereof has become a standard operation in the automobile industry. Thus, it is generally desirable to use an aqueous system also for the topmost layer, i.e., the clear-coat.

To serve this purpose, such an aqueous clear-coat composition with respect to its profile of properties must at least be a match for the conventional clear-coat compositions dissolved in organic solvents. The solid contents at the spray viscosity must be high such as to provide sufficient layer thicknesses by one or two spraying steps. Furthermore, the clear-coat films when baked must be well leveled and exhibit high gloss. In addition, the film should be clear and be "full" and have a good "standing".

Also important is reparability. Repair painting to form a well-adhering gravel-resistant coating must be possible, most desirably without grinding by using any conventional base coating, on a first paint already formed by final baking. Furthermore, there must be constituted a good resistance against chemical attacks such as, e.g., against fuels, acids, in particular sulfuric acid (battery acid) or lyes. Very important is resistance to condensed water.

From an ecological perspective, it is desirable to provide surface coating systems which do not contain any organic solvent in order to achieve that during processing and baking environmentally polluting emissions occur practically no longer.

DE-OS 31 28 062 describes emulsion polymers which, according to the application Examples 3 and 4 provided therein were said to be suitable in combination with conventional metallic base coatings for producing weather-resistant two-layer coatings. The requirmenets for reparability and resistance to condensed water during 240 h at 40° C. constant climate (DIN 50017), in combination with aqueous base coatings are not attained.

In EP-A-0 391 271 there have been described aqueous coating compositions which contain, as the main component, a polyester oligomer polyacrylate produced by a free-radical polymerization of ethylenically unsaturated monomers in a hydroxy-functional polyester oligomer which is not polymerizable via a free-radical polymerization.

DE-OS 40 27 594 describes aqueous clear-coat compositions which contain, as binders, emulsion polymers which have been produced with the concomitant use of specific fluorinated ethylenically unsaturated monomers.

All these applications disclose coating compositions which contain relatively large amounts of organic solvents.

Accordingly, it was one object of the present invention to provide aqueous, solvent-free coating compositions which satisfy the requirements of a top coat for automotive bodies and which are, in additional, almost emission-free.

DESCRIPTION OF THE INVENTION

Said object is attained according to the invention by an aqueous coating composition comprising:

an aqueous polyester- and acrylate-based polymer dispersion having a solids content of from 35 to 50% by weight and obtainable by free-radical polymerization of from 80 to 20% by weight of
  a. at least one (meth)acrylic acid ester of mono- or polyalcohols, wherein said esters may contain free hydroxyl groups, and
  b. at least one ethylenically unsaturated, at least monofunctional acid, and optionally
  c. at least one ethylenically unsaturated monomer other than (a) and (b) or mixtures thereof;

with from 20 to 80% by weight of a polyester resin capable of undergoing a free-radical polymerization, containing of from 0.2 to 1.5 polymerizable double bonds per molecule and having a molecular weight of from 300 to 8,000, said resin being obtainable by a polycondensation of at least dihydric polyalcohols with at least dibasic polycarboxylic acids or derivative thereof in the presence of polyalcohols containing at least one polymerizable double bond, the amounts employed of (a), (b) or (c) and the polyester resin being such that the resulting polymer has a hydroxyl value (OH value) of from 30 to 200 and an acid value of from 5 to 100;

at least one amino resin as crosslinking agent, wherein the weight ratio of the solids content of the polymer dispersion to the crosslinking agent is from 60:40 to 85:15;

at least one water-soluble and/or water-emulsifiable low-molecular polyalcohol having a boiling point of at least 200° C. in an amount of from 0.5 to 15% by weight, based on the solids content of the polymer dispersion; and optionally conventional lacquer additives.

Polyalcohols which are suitable within the scope of the invention are non-volatile and selected from glycerol, trimethylolpropane, 1,4-butanediol, 1,2,4-butanetriol, 1,5-pentanediol, 1,6-hexanediol, 1,2,6-hexanetriol, dimethylolcyclohexane, ethoxylated and/or propoxylated pentaerythritol, ethoxylated and/or propoxylated trimethylolpropane, hydroxypivalic acid neopentyl glycol ester (HPN), or the mixtures thereof.

The polyol amount used may be between 0.5 and 15%, preferably 2 to 10%, based on the binder solid.

During the baking process, these non-volatile polyalcohols react with the binder and, consequently, are also incorporated within the network. Surprisingly, by using these polyols the flow and the film formation of the coating composition is improved substantially.

As the (meth)acrylic acid esters (a) of mono- or polyalcohols, wherein said esters may contain free hydroxyl groups, there are employed the esters of methanol, ethanol, propanol, isopropanol and of butyl, tert.-butyl, iso-butyl, allyl, cyclohexyl, ethylhexyl, lauryl and stearyl alcohols and, as the esters of polyalcohols, the mono- and diesters of ethanediol 1,2- or 1,3-propanediol, 1,4-butanediol or 1,6-hexanediol.

As the ethylenically unsaturated, at least monofunctional acid (b) there can be employed acrylic acid, methacrylic acid, vinylsulfonic acid, crotonic acid, maleic acid, fumaric acid, itaconic acid or the semi-esters of maleic acid, fumaric acid or itaconic acid.

As the ethylenically unsaturated monomer (c) other than (a) and (b) which may optionally be contained in the monomer mixture, there can be employed styrene, α-methylstyrene, vinyl toluene, acrylamide, methacrylamide, acrylonitrile or methacrylonitrile.

The preparation of polyester resins is carried out in accordance with conventional procedures well known to the artisan by esterification of dicarboxylic acids or suitable derivatives thereof, e.g., the conceivable anhydrides, with diols. The esterification proceeds for example in the presence of common esterification catalysts at elevated temperature of from 180 to 230° C. in the molten state.

As the at least dihydric polyalcohol there can be used ethyleneglycol, propaneglycol, butanediol, pentanediol, hexanediol, 2,2-dimethylpropanediol, diethyleneglycol, dimethylolcyclohexane, glycerol, trimethylolpropane, or prenaerythritol.

As the at least dibasic polycarboxylic acids there can be used for the preparation of polyesters succinic acid, glutaric acid, adipic acid, azelaic acid, sebacic acid, phthalic acid, isophthalic acid, terephthalic acid, tetrahydophthalic acid, hexahydrophthalic acid, endomethylenetetrahydrophthalic acid, 1,4-cyclohexanedicarboxylic acid, trimellitic acid, tricarballylic acid, dimethylolpropionic acid or the possible anhydrides thereof.

In order to introduce polymerizable double bonds into the polyester molecules, polyalcohols and/or polycarboxylic acids containing polymerizable double bonds are concomitantly used.

Examples of polyalcohols containing at least one polymerizable double bond are glycerol monoallyl ether, trimethylolpropane monoallylether, butenediol or dimethylolpropionic acid monoallylether. It is also possible to prepare a polyester containing carboxyl groups and to bind a monomer carrying oxirane groups such as, for example, allylglycidyl ether or glycidylmethacrylate to these carboxyl groups afterwards.

Preferably the polyester resin contains from 0.5 to 1.0 polymerizable double bonds per molecule. Also preferred is a molecular weight of from 500 to 3,000 for the polyester resin.

The polymer of the polymer dispersion preferably has a hydroxyl value of from 50 to 150. Acid values of from 15 to 40 are preferred for the aqueous dispersion.

The aqueous polymer dispersion is prepared such that one introduces initially into an organic solvent being partially or completely miscible with water from 80 to 20% by weight of a polyester resin capable of undergoing a free-radical polymerization, containing of from 0.2 to 1.5 polymerizable double bonds per molecule and having a molecular weight of from 300 to 8,000 said resin being obtainable by a polycondensation of at least dihydric polyalcohols with at least dibasic polycarboxylic acids or derivatives thereof in the presence of polyalcohols containing at least one polymerizable double bond, and adds to said polyester resin of from 20 to 80% by weight of at least a. one (meth)acrylic acid ester of mono- or polyalcohols, wherein said esters may contain free hydroxyl groups;

b. one ethylenically unsaturated at least monofunctional acid; and optionally c. one ethylenically unsaturated monomer other than (a) and (b) or mixtures thereof, and polymerizes in the presence of a free radical-generating initiator, neutralizes the so obtained product with a base, disperses in water, and distills the organic solvent off, if necessary under reduced pressure.

Preferred for use as the organic solvents are those being fully or partially water-miscible and so volatile that they can be eliminated by distillation, if necessary under reduced pressure. These solvents are selected from ethanol, propanol, butanol, acetone, methylethylketone, methylisobutylketone, and the mixtures thereof.

For initiating the free-radical polymerization there can be employed common radical-generating initiators selected from di-tert.-butyl peroxide, dicumyl peroxide, dibenzoyl peroxide, dilauryl peroxide, cumol hydroperoxide, tert.-butyl hydroperoxide, tert.-butyl perbenzoate, tert.-butyl perpivalate, tert.-butyl per-3,5,5-trimethylhexanoate, tert,-butyl per-2-ethylhexanoate, di-2-ethylhexyl peroxydicarbonate, dicyclohexyl peroxydicarbonate, 1,1-bis-(tert.-butylperoxy)-3,5,5-trimethylcyclohexane, 1,1-bis-(tert.-butylperoxy) cyclohexane, cyclohexanone peroxide, methylisobutylketone peroxide, 2,2'-azo-bis-(2,4-dimethylvaleronitrile), 2,2'-azo-bis-(2-methylbutyronitrile), 1,1'-azo-bis-cyclohexanecarbonitrile, or azo-bis-isobutyronitrile.

The free radical-initiated polymerization itself is carried out at temperatures between 80° C. and 160° C.

The amounts employed of the monomers bearing hydroxyl groups (a), (b) and optionally (c) should be chosen so that the total system of the aqueous dispersion has a hydroxyl value, based on solids, of from 30 to 200, preferably of from 50 to 150 and particularly preferred of from 80 to 120.

For the stability of the aqueous polymer dispersions it is important that the produced polymers contain a sufficient amount of groups capable of forming anions, preferably carboxyl groups. These may be introduced via the polyester campaigned as well as via the (meth)acrylic acid component (a), but they may also be introduced via both of these steps. However, preferred is the introduction via the (meth)acrylic acid component (a). The acid value of the polymers produced according to the invention may be between 5 and 100, preferably between 15 and 40.

When polyunsaturated monomers (a), (b) and optionally (c) are used, there is a danger of gelation. Therefore it is necessary that the reaction conditions are adjusted to the types and amounts of such monomers. If desired or required it may make sense to concomitantly use so-called modifiers. Such modifiers have been described in EP-A-0 158 161. These are compounds such as, e.g., dodecylmercaptane or mercaptoethanol.

The polymerization is followed by converting the product into an aqueous dispersion. To this end, the groups capable of forming anions first must be at least partially neutralized. The neutralization is effected to a pH of from 7 to 10, and preferably of from 7.3 to 8.5.

For the neutralization there may be used bases such as ammonia or volatile primary, secondary and/or tertiary organic amines, especially ethylamine, dimethylamine, triethlamine, morpholine, piperidine, diethanolamine, triethanolamine, dimethylethanolamine, or mixtures thereof. Especially preferred is dimethylethanolamine. It is advantageous to add the neutralizing agent as a diluted aqueous solution. Subsequent to the dispersion in water the organic solvent is removed by distillation, optionally under reduced pressure.

The solids content of the dispersions is between 35 and 50% by weight, preferably between 35 and 45% by weight. The polymer dispersions thus obtained are used for the production of the aqueous coating compositions according to the invention, especially aqueous clear-coat compositions for production-line application of two-layer coatings, especially for automotive bodies. For this, the aqueous polymer dispersions have to be mixed with crosslinking agents, said polyalcohol, and optionally with the common additives.

Suitable as crosslinking agent is any amino resin crosslinker as used in the filed of painting, if it is practically solvent-free and does not impair the water-dilutability of the coat composition. Preferably, the weight ratio of the solids content of the polymer dispersion to the crosslinking agent is from 65:35 to 75:25 and especially preferred is 70:30. Melamine-formaldehyde resins are preferably employed.

The aqueous clear-coat compositions may be mixed, in the place of the amino resins or in addition to these, with polyisocyanates as crosslinkers and can be processed as two-component clear-coat compositions and can be cured at room temperature. For this, for example, the so-called "surface coating polyisocyanates" on the basis of hexamthylene diisocyanate, or 1-isocyanato-3,5,5-trimethylcyclohexyl isocyanate (isophorone diisocyanate), and/or 4,4'-dicyclonhexylmethane diisocyanate are suitable. By "surface coating polyisocyanates" there are to be understood the derivatives of said diisocyanates bearing biuret, urethane, uretdione and/or isocyanurate groups being known per se. Hydrophilic polyisocyanates as described in EP-A 0 061 628, EP-A 0 206 059, and EP-A 0 469 389 are suitable as well.

Capped (blocked) polyisocyanates may also be used as crosslinking agents. Capped polyisocyanates which undergo cleavage at temperatures below 150° C. are preferred. The capped polyisocyanates as described in DE-OS 27 12 931, DE-OS 27 32 662, DE-OS 27 32 775, DE-OS 27 44 782, DE-OS 27 08 611 are suitable. A trimerized isophorone diisocyanate capped with butanone oxime as marketed by Huls AG company under the mark "Vestanat® T1890" serves as an example.

The aqueous coating compositions according to the invention may still contain, in addition to the polymer dispersion according to the invention, additional water-compatible binders selected from polyesters, polyethers, polyurethanes, and polyacrylates. The additional amount may be from 0 to 20% by weight, based on solids.

The clear-coat compositions according to the invention may contain conventional additives such as leveling agents, wetting agents, light-protective agents, or rheology aids.

The clear coat compositions according to the invention may be applied by conventional application techniques. The preferred application technique is spraying, preferably using electrostatic high-speed turbo bells. However, the clear-coat compositions may also be applied by brushing, knife coating or immersion.

The aqueous clear-coat compositions according to the invention are particularly suitable for use as top clear-coat composition in multi-layer coating in the automobile industry. They are in particular distinguished over the conventional systems containing organic solvents by the negligble content of organic solvents along with a high content of solids and a low viscosity. Due to the negligible content of organic solvents, the aqueous clear-coat compositions are further distinguished by a high environmental compatibility.

The aqueous clear-coat compositions may be applied "wet-in-wet" onto an aqueous or non-aqueous based coating. The wet-in-wet application does not exclude that the base coating is allowed to become touch dry before the clear-coat composition is applied; both coatings are commonly cured or baked, respectively (e.g., at from 130° C. to 160° C. for from 15 to 30 minutes.).

The coating films prepared from the aqueous clear-coat systems according to the invention are distinguished by a high level of properties being equal to that of the known solvent-containing systems. Properties such as surface hardness, transparency, gloss, build, flow, scratch resistance, elasticity, stability against solvents, against preservatives, against specific chemicals such as, sulfuric acid, sodium hydroxide solution, brake fluid, diesel fuel and gasoline, the accelerated and the long-term weathering test results are at least as good, typically, however, better than known solvent-containing systems or other aqueous systems as known in the prior art. Moreover, the aqueous coating compositions have a good storage stability.

The following examples serve for illustrating the invention.

EXAMPLES

Polyester A

In a 2 liter reaction vessel equipped with an agitator and a packed column there are melted 92 parts of 1,6-hexanediol, 73 parts of trimethylolpropane monoallylether, 250 parts of neopentyl glycol, 80 parts of trimethylolpropane, 554 parts of cyclohexane-1,2-dicarboxylic acid anhydride, and 2 parts of dibutyltin oxide and heated with stirring such that the still head temperature doe not exceed 100° C.

While doing so, the temperature of the reaction mixture should not exceed 230° C. The esterification is continued until an acid value of <4 is attained. After cooling to <80° C. there is diluted with 328 parts of methyl ethyl ketone to a solids content of 75%.

A polyester with a calculated average molecular weight of 1680 and a hydroxyl value of 100 (related to solid resin) is obtained.

Example 1

In a 4 liter reaction vessel equipped with an agitator, thermometer, reflux condenser, and 2 feed vessels there are weighted in 532 parts of polyester resin A together with 76 parts of methyl ethyl ketone.

Into one of said two feed vessels there is weighted in a monomer mixture composed of 103 parts of butyl methacrylate, 20 parts of styrene monomer, 48 parts of 2-hydroxypropyl acrylate, 53 parts of 2-hydroxypropyl methacrylate, and 17 parts of acrylic acid. In the other feed vessel there is prepared the initiator solution comprised of 10 parts of 2,2'-azo-bis-isobutyronitrile (AIBN) and 69 parts of methyl ethyl ketone. After heating the contents of the reaction vessel to 80° C., the monomer mixture is added within 3 h and the polymerization initiator solution within 3.5 h simultaneously. The polymerization temperature is kept at 80° C. After finishing the feeds, there is agitation for another 1.5 h at 80° C. Thereafter, there are added 13 parts of dimethylethanolamine (which corresponds to a neutralization level of 60%) and 1000 parts of completely demineralized water.

The methyl ethyl ketone is distilled off under reduced pressure at max. 55° C.

One obtains dispersion with a solids content of 43% and a pH of 7.70.

The polymer has an acid value of 18 and a Hydroxyl value of 111.

Application Examples 1–5

Using a high-speed mixer, 620 parts of the dispersion of example 1 are well mixed with 143 parts of an 80% aqueous solution of a commercial, water-dilutable melamine-formaldehyde resin (Luwipal® LR8839). Then the pH is adjusted with dimethylethanolamine to 8.60–8.70. Subsequently, 0.09 parts of a commercial leveling agent (Fluorad® FC430) and 4.6 parts of a commercial, silicon resin-containing additive (Additol® XW329) are added one after another and mixed.

The polyalcohols as listed in Table 1 are added to this mixture, each mixture being adjusted with completely demineralized water to a spraying consistency of 18 s (as measured at 20° C. in the DIN 4 mm beaker).

TABLE 1

| application example | 1 | 2 | 3 | 4 | 5 |
|---|---|---|---|---|---|
| base lacquer | 350 | 350 | 350 | 350 | 350 |
| propoxylated pentaerythritol | 17.5 | — | — | — | — |
| propoxylated trimethylolpropane | — | 17.5 | — | — | — |
| hydroxypivalic acid neopentyl glycol ester (HPN) | — | — | 17.5 | — | — |
| dimethylolcylohexane | — | — | — | 17.5 | — |
| trimethylolpropane | — | — | — | — | 17.5 |
| water, completely dimineralized | 49.5 | 42.9 | 67.3 | 53 | 45.1 |

The obtained clear-coats of examples 1–5 were sprayed on a water-dilutable metallic base coating which had before been surface-dried for 10 min at 100° C. in a coating thickness of 35–40 μm, pre-dried for 10 min at 80° C., and baked for 20 min at 150° C. The obtained coatings were tested (see Table 2).

TABLE 2

| application example | 1 | 2 | 3 | 4 | 5 |
|---|---|---|---|---|---|
| spraying consistency | 18 | 18 | 18 | 18 | 18 |
| solids content | 44% | 43% | 41% | 42% | 44% |
| adhesion | GT0 | GT0 | GT0 | GT0 | GT0 |
| condensed moisture test | + | + | + | + | + |
| resistance against xylene | + | + | ++ | + | + |
| resistance against H$_2$O$_4$ | + | + | + | + | + |
| resistance against NaOH | ++ | ++ | ++ | ++ | ++ |
| Knoop hardness number | 12 | 11 | 13 | 14 | 11 |
| indentation (mm) | 5.7 | 8.8 | 7.1 | 6.1 | 8.9 |

[++] = very good, [+] = good, [−] = poor, [−−] = very poor

What is claimed is:

1. An aqueous coating composition comprising:
   a. an aqeous, polyester- and acrylate-based polymer dispersion having a solids content of from 35 to 50% by weight and obtainable by free radical polymerization of:
      1.) from 80 to 20% by weight of:
         i. at least one (meth) acrylic acid ester of mono- or polyalcohols, wherein said esters may contain free hydroxyl groups;
         ii. at least one ethylenically unsaturated, at least monofunctional acid and optionally
         iii. at least one ethylenically unsaturated monomer other than i and ii or mixtures thereof: with
      2.) from 20 to 80% by weight of a polyester resin capable of undergoing free-readical polymerization containing of from 0.2 to 1.5 polymerizable double bonds per molecule and having a molecular weight of from 300 to 8,000, said resin being obtainable by a polycondensation of at least dihydric polyalcohols with at least dibasic polycarboxylic acids or derivatives thereof in the presence of polyalcohols containing at least one polymerizable double bond, the amounts employed of i,ii and iii and the polyester resin being such that the resulting polymer has a hydroxyl value (OH value) of from 30 to 200 and an acid value of from 5 to 100;
   b. at least one amino resin as crosslinking agent, wherein the weight ratio of the solids content of the polymer dispersion to the crosslinking agent is from 60:40 to 85:15;
   c. at least one water-soluble and/or water-emulsifiable low-molecular weight polyalcohol comprising dimethylolcyclohexane and in an amount of from 0.5% to 15% by weight, based on the solids content of the polymer dispersion said low-molecular polyalcohol being non-volatile and reacting with said amino resin under baking conditions; and optionally
   d. conventional lacquer additives.

2. An aqueous coating composition comprising:
   a. polymer dispersion having solids content of from 35% to 50% by weight and obtainable by free-radical polymerization of:
      1.) from 50% to 20% by weight of:
         i. at least one (meth) acrylic acid ester of mono- or polyalcohols, wherein said esters may contain free hydroxyl groups;
         ii. at least one ethylenically unsaturated, at least monofunctional acid; and optionally
         iii. at least one ethylenically unsaturated monomer other than i or ii mixtures thereof; with
      2. from 20% to 80% by weight of polyester resin capable of undergoing a free-radical polymerization, containing of from 0.2 to 1.5 polymerizable double bonds per molecule and having a molecular weight of from 300 to 8,000 said resin being obtainable by a polycondensation of at least dihydric polyalcohols with at least dibasic polycarboxylic acids or derivatives thereof in the presence of polyalcohols containing at least one polymerizable double bond, the amounts employed of i,ii and iii and the polyester resin being such that the resulting polymer has a hydroxyl value (OH value) of from 30 to 200 and an acid value of from 5 to 100;
   b. at least one amino resin as crosslinking agent, wherein the weight ratio of the solids content of the polymer dispersion to the crosslinking agent is from 60:40 to 85:15;
   c. at least one water-soluble and/or water-emulsifiable, low-molecular weight polyalcohol comprising dimethylolcyclohexane and having a boiling point of at least 200° C. in an amount of from 0.5% to 15% by weight, based on the solids content of the polymer dispersion, said low-molecular polyalcohol being non-volatile and reacting with said amino resin under baking conditions; and optionally
   d. conventional lacquer additives.

3. The coating composition according to claim 2 characterized in that the amino resin is selected from water-soluble and/or water-dispersible amino resins.

4. The coating composition according to claim 3 characterized in that the amino resin is selected from melamine-formaldehyde resins.

5. The coating composition according to claim 2 characterized in that in addition to the amino resin there is employed a polyisocyanate as crosslinking agent.

6. The coating composition according to claim 2 characterized in that it is present in the form of a clear coat.

7. The coating composition according to claim 2 characterized in that the (meth) acrylic acid ester of monoalcohols is selected from the esters of methanol, ethanol, propanol, iso-propanol, butyl, tert.-butyl, iso-butyl, allyl, cyclohexyl, ethylhexyl, lauryl and stearyl alcohols and, the esters of polyalcohols from the mono and diesters of ethanediol, 1,2- or 1,3-propanediol, 1,4-butanediol, 1,6-hexanediol or mixtures thereof.

8. The coating composition according to claim 2 characterized in that the ethylenically unsaturated, at least monofunctional acid is selected from acrylic acid, methacrylic acid, vinylsulfonic acid, crotonic acid, maleic acid, fumaric acid, itaconic acid or the semi-esters of maleic acid, fumaric acid, itaconic acid, or mixtures thereof.

9. The coating composition according to claim 2 characterized in that the ethylenically unsaturated monomer other than (a) and (b) is selected from styrene, α-methylstyrene, vinyl toluene, acrylamide, methacrylamide, acrylonitrile, methacrylonitrile or mixtures thereof.

10. The coating composition according to claim 2 characterized in that the at least dihydric polyalcohol is selected from ethyleneglycol, 1,3- and 1,2-propaneglycol, 1,4-butanediol, 1,5-pentanediol, 1,6-hexanediol, 2,2-dimethylpropanediol, diethyleneglycol, triethyleneglycol, tetraethyleneglycol, hexaethyleneglycol, 1,3-dimethylolcyclohexane or 1,4-dimethylolcyclohexane, glycerol, trimethylolpropane, pentaerythritol or mixtures thereof.

11. The coating composition according to claim 2 characterized in that the at least dibasic polycarboxylic acid is selected from succinic acid, glutaric acid, adipic acid, azelaic acid, sebacic acid, phthalic acid, isophthalic acid, terephthalic acid, tetrahydrophthalic acid, hexahydrophthalic acid, endomethylenetetrahydrophthalic acid, 1,2-, 1,3- or 1,4-cyclohexanedicarboxylic acid, muconic acid and camphoric acid, trimellitic acid, tricarballylic acid, dimethylolpropionic acid or the anhydrides thereof, or mixtures thereof.

12. The coating according to claim 2 characterized in that the polyalcohol containing at least one polymerizable double bond is selected from glycerol monoallylether, trimethylolpropane monoallylether, 1,4-butenediol, dimethylolpropionic acid monoallylether or mixtures thereof.

13. The coating composition according to claim 2 characterized in that the polyester resin contains 0.5 to 1.0 polymerizable double bonds.

14. The coating composition according to claim 2 characterized in that it has a hydroxyl value of from 80 to 120.

15. The coating composition according to claim 2 characterized in that it has an acid value of from 15 to 40.

16. The coating composition according to claim 2 characterized in that in addition to the polymer dispersion it contains at least one additional binder selected from polyesters, polyurethanes, polyacrylates and mixtures thereof.

17. A clear coat composition for the manufacture of multi-layer coatings, comprising the aqueous coating composition of claim 2.

* * * * *